United States Patent [19]

Mrozinski

[11] Patent Number: 5,238,623
[45] Date of Patent: Aug. 24, 1993

[54] METHOD FOR PREPARING MICROPOROUS POLYOLEFIN SHAPED ARTICLES

[75] Inventor: James S. Mrozinski, Oakdale, Minn.

[73] Assignee: Minnesota Mining and Manufacturing Company, St. Paul, Minn.

[21] Appl. No.: 840,291

[22] Filed: Feb. 24, 1992

Related U.S. Application Data

[60] Division of Ser. No. 713,646, Jun. 10, 1991, Pat. No. 5,120,594, which is a continuation of Ser. No. 439,457, Nov. 20, 1989, abandoned.

[51] Int. Cl.$^5$ ............................................. B29C 67/20
[52] U.S. Cl. ........................................ 264/48; 264/49; 264/167; 264/177.17; 264/210.2; 264/210.6; 264/211.12; 264/237; 264/284; 264/288.8; 264/289.3; 264/290.2
[58] Field of Search ................ 264/41, 48, 49, 167, 264/177.1, 177.17, 177.2, 210.2, 210.6, 211, 211.12, 232, 237, 284, 288.8, 289.3, 290.2

[56] References Cited

U.S. PATENT DOCUMENTS

| | | | |
|---|---|---|---|
| 4,247,498 | 1/1981 | Castro | 264/41 |
| 4,539,256 | 9/1985 | Shipman | 428/315.5 |
| 4,564,488 | 1/1986 | Gerlach et al. | 264/41 |
| 4,659,470 | 4/1987 | Caneba et al. | 210/500.21 |
| 4,726,989 | 2/1988 | Mrozinski | 428/315.5 |
| 4,777,073 | 10/1988 | Sheth | 428/155 |
| 4,814,124 | 3/1989 | Aoyama et al. | 264/41 |
| 4,863,792 | 9/1989 | Mrozinski | 428/315.5 |
| 4,867,881 | 9/1989 | Kinzer | 210/490 |
| 4,873,034 | 10/1989 | Kono et al. | 264/41 |
| 4,877,679 | 10/1989 | Leatherman et al. | 428/224 |
| 4,898,698 | 2/1990 | Tweedle et al. | 264/41 |
| 4,915,886 | 4/1990 | Repetti et al. | 264/41 |

*Primary Examiner*—Leo B. Tentoni
*Attorney, Agent, or Firm*—Gary L. Griswold; Walter N. Kirn; Carole Truesdale

[57] ABSTRACT

A method for preparing a microporous polyolefin shaped article which includes the steps of (1) melt blending a polyolefin with an additive which is miscible with the polymer at the melt temperature of the blend but which phase separates on cooling to form a solution; (2) forming a shaped article from the solution; (3) cooling the shaped article by use of a patterned chill roll to provide areas on the surface of the article where the polymer mixture does not contact the chill roll; and (4) (a) removing at least a substantial portion of the compatible liquid; or (b) stretching the article in at least one direction sufficient to permanently attenuate the article and effect orientation of the polymer; or (c) a combination of (a) and (b) to form a microporous polyolefin shaped article. The article is of substantially uniform thickness and has a patterned surface. The patterned surface provides substantially skinless areas having high microporosity and skinned areas or reduced porosity.

7 Claims, No Drawings

METHOD FOR PREPARING MICROPOROUS POLYOLEFIN SHAPED ARTICLES

This is a division of application Ser. No. 07/713,646 filed Jun. 10, 1991 now U.S. Pat. No. 5,120,594 which is a continuation of application Ser. No. 07/439,457 filed Nov. 20, 1989, now abandoned.

FIELD OF THE INVENTION

The present invention relates to microporous thermoplastic polymeric shaped articles, particularly films, which have excellent liquid, gas and vapor permeability.

BACKGROUND OF THE INVENTION

Microporous films or membranes have a structure that enables fluids to flow through them. The effective pore size is at least several times the mean free path of the flowing molecules, namely form several micrometers down to about 100 Angstroms. Such sheets are generally opaque, even when made of transparent material, because the surfaces and the internal structure scatter visible light. The term "microporous film" as used herein is inclusive of microporous membranes.

Microporous films have long been known to make excellent filters for removing particulates form gases, liquids, and vapors. Such applications include the filtration of solids, the ultrafiltration of colloidal matter, bacteria filtration, as diffusion barriers or separators in electrochemical cells, and for filter cleaning antibiotics, beer, oils, bacteriological samples, intravenous fluids, vaccines and the like. Microporous films are also utilized in air filters, where it is important to remove very small particles from air streams. An example would be as breather filters used in sensitive electronic applications such as computer disk drives. Such an application requires the passage of a large volume of air through a filtration media of limited effective area with minimal resistance or pressure drop. Microporous films are also useful in breathable, i.e., liquid impermeable, vapor permeable, films for use in garments, disposable diapers and the like.

The art of preparing microporous structures is replete with a wide variety of methods for producing such articles. One common method utilizes the phase separation phenomenon which utilizes either liquid-liquid or solid-liquid phase separation. The method for producing microporous structures using these techniques usually involves melt blending the polymer with a compatible liquid that is miscible with the polymer at the casting or extrusion temperature, forming a shaped article of the melt blend, and cooling the shaped article to a temperature at which the polymer phase separates from the compatible liquid. Microporosity is imparted to the resultant structure by removing the compatible liquid, orienting the structure in at least one direction, or both removing the compatible liquid and orienting. The cooling step for films is usually accomplished by contacting the film with a chill roll. This results in a thin skin being formed on the side of the film which contacts the chill roll, which results in a decrease in the fluid flow through the film. Such methods are described, for example, in U.S. Pat. Nos. 4,247,498 (Castro), 4,539,256 (Shipman), 4,726,989 (Mrozinski) and 4,867,881 (Kinzer).

Although useful microporous films and membranes are provided by the above-described techniques, there is a need for microporous films and membranes which have a higher permeability to fluids but still retain the excellent filtration properties and mechanical properties of the aforementioned structures.

U.S. Pat. No. 4,564,488 (Gerlach) discloses a process for preparing porous fibers and membranes. The fibers and membranes are characterized by a smooth porous surface and an apparent density of between about 10 and 90% of the true density of the polymeric starting material employed. The process involves the formation of a homogeneous mixture of a meltable polymer and a liquid inert with respect tot he polymer. The mixture formed must be of a binary type, in which there is a temperature range of complete miscibility and a range in which there is a miscibility gap. The mixture is extruded at a temperature above the separation temperature into a bath containing at least some of the inert liquid which is at a temperature below the separation temperature. Upon introduction of the mixture into the bath, the fiber or membrane structure of the product is fixed.

U.S. Pat. No. 4,777,073 (Sheth) discloses a breathable film produced by stretching a precursor film prepared from a polyolefin/filler composition. The precursor film is melt embossed with a patterned melt embossing roller and the film is stretched to impart a pattern of different film thicknesses having greater permeability within the areas of reduced thickness in comparison to the areas of greater thickness. The permeability and strength of the film are reported to be improved.

U.S. Pat. No. 4,814,124 (Aoyama et al.) discloses a gas permeable porous film which is prepared by stretching a film made from a mixture containing a polyolefin resin and an inorganic filler at least uniaxially and possesses a rugged pattern on its surface. One process for producing the film comprises forming the aforesaid mixture into a film, providing on the surface of the film a rugged pattern, stretching the resulting film at least uniaxially, and forming on the stretched film thusformed a second distinct rugged pattern by means of a heated embossing roll and simultaneously allowing the stretched film to contract.

SUMMARY OF THE INVENTION

The present invention, in one aspect, provides a microporous polyolefin shaped article comprising a polyolefin substrate of substantially uniform thickness having a patterned surface, the patterned surface providing substantially skinless areas having high microporosity and skinned, i.e., skin bearing, areas of reduced microporosity. As used herein, the term "substantially uniform thickness" means that the thickness varies less than 20%, preferably less than 10% from skinned to skinless areas, the term "substantially skinless" means surface areas which contain numerous micropores ranging in size form 0.05 to 10.0 microns, and the term "skinned" means surface areas which contain few micropores, e.g., less than 50% as many as are contained in the skinless area. The resulting microporous article has high permeability to gases, liquids and vapors due to the skinless areas in the patterned surface, and good mechanical properties and handleability due to the skinned areas in the patterned surface.

The present invention further provides a method for preparing a microporous polyolefin shaped article which comprises the steps of (1) melt blending a polyolefin with an additive which is miscible with the polymer at the melt temperature of the blend but which phase separates on cooling, (2) forming an article form the solution;

(3) cooling the shaped article by use of a patterned chill roll to provide areas where the polymer mixtures does not contact the chill roll; and (4)
(a) removing at least a substantial portion of the compatible liquid; or
(b) stretching the article in at least one direction sufficient to permanently attenuate the article and effect orientation of the polymer; or
(c) a combination of (a) and (b).

DETAILED DESCRIPTION OF THE INVENTION

Polyolefins useful int he present invention preferably include the polymers of ethylene and propylene also may include polymers of 1-octene, 1-butene, 1-methyl-4-pentene, styrene, and the like, and copolymers and blends of two or more such olefins that may be polymerized to contain crystalline and amorphous segments and mixtures of stereo-specific modification of such polymers, e.g., mixtures of isotactic polypropylene and atactic polypropylene, isotactic polystyrene and atactic polystyrene.

The compatible liquid is a material which is capable of forming a solution with the thermoplastic polymer when heated above the melt temperature of the polymer and which separates from the polymer on cooling. The compatibility of the liquid with the polymer can be determined by heating the polymer and the liquid to form a clear homogeneous solution. If a solution of the polymer and the liquid cannot be formed at any liquid concentration, then the liquid is inappropriate for use with that polymer. See, for example, U.S. Pat. No. 4,247,498 (Castro) and U.S. Pat. No. 4,539,256 (Shipman), both of which are incorporated herein by reference.)

In practice, the liquid used may include compounds which are solid at room temperature but liquid at the melt temperature of the polymer. The operability of a specific liquid with a given polymer cannot be predicted with absolute certainty. However, certain guidelines can be set forth. For non-polar polymers, non-polar or partially polar organic liquids with similar room temperature solubility parameters are generally useful at the solution temperatures. When blends of polymers are used, useful liquids are those which are compatible liquids for each of the polymers used. Blends of two or more liquids can be used as the compatible liquid as long as the selected polymer is soluble in the liquid blend at the polymer melt temperature and the solution formed phase separates on cooling.

Various types of organic compounds have been found useful as the compatible liquid, including aliphatic and aromatic acids, aliphatic, aromatic and cyclic alcohols, aldehydes, primary and secondary amines, aromatic and ethoxylated amines, diamines, amides, esters and diesters, ethers, ketones and various hydrocarbons such as mineral oil, and heterocyclics. When the polymer selected is polypropylene, aliphatic hydrocarbons such as mineral oil, esters such as dibutyl phthalate and ethers such as dibenzyl ether are useful as the compatible liquid. When high density polyethlene is the polymer, an aliphatic hydrocarbon such a mineral oil or an aliphatic ketone such as methyl nonyl ketone or an ester such as dioctyl phthalate are useful as the compatible liquid. Compatible liquids for use with low density polyethylene include hydrocarbons such as mineral oil, aliphatic acids such as decanoic acid and oleic acid or primary alcohols such as decyl alcohol.

The patterned surface on the microporous polymer is of course the negative of the patterned surface on the chill roll which this polymer contacts. This pattern can be any geometry such as lands and grooves, lands and depressions, concave or convex pyramids or cones, or the like, provided that the resulting skinless area on the microporous film is preferably at least 10 percent, more preferably 20 percent of the total surface area. The skinless area can comprise up to about 90 percent of the total surface area with adequate mechanical properties being retained.

The patterned microporous structures of this invention can be oriented, i.e., stretched beyond their elastic limit to introduce permanent set or elongation and to ensure that the micropores are permanently developed or formed. Orientation can be carried out either before or after removal of the compatible liquid. This orientation of the microporous structure aids in controlling pore size and enhances both the porosity and the mechanical properties of the material. Orientation can be used as a process variable to control thickness and relatively thin microporous films can be produced. Thickness is particularly important for microporous film application where selective transport through the microporous film is desired, since the rate of transport is inversely proportional to the thickness. The open areas of the patterned surface of the present invention contribute significantly to the rate of transport while the not so open areas contribute to the mechanical strength of the film. Orientation also enhances the mechanical strength microporous film applications.

With increasing orientation, film thickness and resistance to flow are proportionately reduced, mechanical strength, porosity and pore size are proportionately increased, and the pore size range is extended with improved pore size control, so that an excellent balance of desired properties can be attained through selection of the amount of orientation to which the microporous film is subjected.

The patterned microporous structures may be uniaxially or biaxially oriented. Preferably, the microporous structures are stretched at least about 10 percent, more preferably about 10 to 1000 percent. The actual amount of stretching required is dependent upon the particular composition of the article and the degree of porosity desired. Stretching of the structure is preferably uniform so that the oriented structure has uniform, controlled porosity. When the structures are uniaxially oriented, narrowing of the structure in the non-oriented direction generally occurs, such that stretching a structure, for example, a film stretched 50 percent, does not result in a 50 percent increase in surface area, but something less than a 50 percent increase. The orientation is preferably dimensionally stabilized in the material using well-known techniques such as, for example, heating the material to a stabilizing temperature under restraint.

The compatible liquid may be left in the patterned microporous material if desired. The patterned microporous films of this invention with the compatible liquid not removed, are useful for applications where a vapor permeable but water impermeable film is desired, as for example in cover sheets for diapers. The compatible liquid may be removed form the patterned microporous material either before or after orientation to yield a liquid-free microporous polymeric material. The compatible liquid can be removed by, for example, solvent extraction, volatilization, or any other convenient method.

The patterned microporous materials of the present invention are useful in a variety of applications where microporosity is desirable. However, the combination of high porosity and high fluid permeability of the present invention make the materials extremely useful for filtration applications. For example, the patterned microporous materials can be used for breather filters used in computer disk drives. Other examples include ultrafiltration of colloidal matter, diffusion barriers or separators in electrochemical cells, air sample collection media, microbiological sample collection media, breathable surgical dressings and bandages, and disposable articles such as diapers and incontinent products The following examples further illustrate this invention, but the particular materials and amounts thereof in these examples, as well as other conditions and details, should not be construed to unduly limit this invention.

In the examples, all parts and percentages are by weight unless otherwise specified. Where stretch ratios are recited for extruded films, the first number indicates the stretch ratio of the machine direction (MD), i.e., extrusion direction, and the second number indicates the stretch ratio in the direction transverse to the extrusion direction (TD).

In the examples, the following test methods were used in evaluating the various films:

Furley Value: This value is a measurement of time in seconds to pass 50 cc of air through a film according to ASTM D-726 Method A.

Maximum Effective Pore Diameter: This value is measured in microns according to ASTM F-316 and is termed pore diameter in the examples.

Bulk Density: This value is determined from measurement of specific gravity according to ASTM D-792.

Porosity: A calculated value based on the measured bulk density and polymer density using the following equation:

$$\text{Porosity} = \left(\frac{1 - \text{bulk density}}{\text{polymer density}}\right) \times 100$$

Bulk Tensile: Measured values according to ASTM D-882 using a Instron TM model 1122 under the following conditions:

| Jaw gap: | 2 inches |
| Jaw speed: | 20 in/min |
| Sample size: | 1 inch wide strip |

Matrix Tensile: Calculated value based on the bulk tensile strength and porosity according to the following equation:

$$\text{Matrix Tensile} = \left(\frac{100}{100 - \text{Porosity}}\right) \times \text{Bulk Tensile}$$

% Elongation to Break: This value is the amount of stretching that the film experienced before breaking using ASTM D-882.

EXAMPLE 1

Polypropylene (Profax TM 6723, available from Himont Incorporated), 0.3 weight percent dibenzylidene sorbitol nucleating agent (Millad TM 3905, available from Milliken Chemical), based on the weight of the polypropylene, and mineral oil (Amoco TM White Mineral Oil #31 USP Grade available from Amosoc Co.) at a weight ratio of polypropylene to mineral oil of 38.62, was mixed in a Berstorff TM 40 mm twin screw extruder operated at a decreasing temperature profile of 270° C. to 205° C., and the mixture was extruded, at a total throughput rate of 9.08 kg/hr., from a 30.5 cm ×0.4 mm slit gap sheeting die onto a patterned chill roll casting wheel containing parallel groove spaced 0.0127 cm on center and cut 0.0178 cm deep in a V-pattern. The wheel was maintained at 37.8° C., and the extruded material solid-liquid phase separated. A continuous sheet of this material was collected at 2.9 meter/min. and passed through a 1,1,1-trichloroethane bath to remove the mineral oil. An 11.4 cm × 11.4 cm sheet of this material was biaxially oriented on a laboratory stretching device (T. M. Long Laboratory Stretcher), 2.0× 2.0 at 121° C. This process resulted in a microporous material having areas on the surface that were highly open in microporosity corresponding to the groove portion of the chill roll, and areas less open in microporosity, corresponding to the land portion of the chill roll. The porous and physical film properties are listed in Table I.

COMPARATIVE EXAMPLE C1

A nucleated polypropylene/mineral oil blend was prepared and extruded as in Example 1. The extruded material was cast onto a smooth chill roll casting wheel maintained at 37.8° C. and the material underwent solid-liquid phase separation. A continuous sheet of this material was collected at 2.9 meters per minute and passed through a 1,1,1-trichloroethane bath to remove the mineral oil. An 11.4 cm × 11.4 cm sheet of this material was then biaxially oriented as in Example 1. This procedure resulted in a microporous material having a thin, tightly closed microporous skin layer on the wheel quenched surface. The porous and physical properties are listed in Table I.

TALBE I

| | Example 1 | Comparative Example 1 |
|---|---|---|
| Thickness (microns) | 58 | 53 |
| Bulk density (g/cc) | 0.20 | 0.30 |
| Porosity (%) | 77.6 | 66.8 |
| Pore Diameter (μm) | 0.37 | 0.083 |
| Gurley value (sec/50 cc) | 12 | 18,100 |
| Break elongation (%) | | |
| MD | 67 | 92 |
| TD | 71 | 81 |
| Bulk tensile at break | | |
| (kPa) MD | 17,437 | 23,284 |
| TD | 9267 | 1683 |
| Matrix tensile at break | | |
| (kPa) MD | 77,842 | 70,134 |
| TD | 41,369 | 34,950 |

As can be seen from the data in Table 1, the film of Example 1 has significantly higher pore diameter and lower Gurley value than the film of Comparative Example 1, while exhibiting only slightly reduced elongation and bulk tensile values.

EXAMPLE 2

Polypropylene (Profax ™ 6723) was extruded on a 25 mm twin screw extruded, using the temperature profile used in Example 1, while tallow amine (Armostat ™ 310, available from Armak Chemical Co.) maintained at 60° C. was injected into the extruder at a rate such that the polypropylene: tallow amine weight ration was 44:56 and the total throughput rate of the components was 3.63 kg/hr. The molten blend was cast from a 30.5 cm ×0.4 mm slit gap sheeting die onto a patterned chill roll coating wheel containing parallel grooves as in Example 1 which was maintained at 54° C. to cause liquid-liquid phase separation of the blend. The thus-produced film was then solvent washed in 1,1,1-trichloroethane to remove the tallow amine. This procedure resulted in a porous material having areas of more open microporosity corresponding to the groove portion of the casting wheel and less open areas of microporosity corresponding to the land portion of the casting wheel. Further, the loss of extruded width of material during film formation was only about 5%, the final film being 29.0 cm in width. Film properties are set forth in Table II.

EXAMPLE 3

The microporous film of Example 2 was uniaxially stretched 2.0:1 at 121° C. on a laboratory stretching device. These film properties are also set forth in Table II.

TABLE II

|  | Example 2 | Example 3 |
| --- | --- | --- |
| Thickness (microns) | 190 | 152 |
| Bulk density (g/cc) | 0.43 | 0.28 |
| Porosity (%) | 52.2 | 68.8 |
| Pore Diameter (μm) | 0.113 | 0.178 |
| Gurley value (sec/50 cc) | 643 | 112 |
| Break elongation (%) |  |  |
| MD | 353 | 154 |
| TD | 400 | 267 |
| Bulk tensile at break |  |  |
| (kPa) MD | 8708 | 16,456 |
| TD | 9687 | 6915 |
| Matrix tensile at break |  |  |
| (kPa) MD | 18,216 | 52,766 |
| TD | 20,264 | 22,167 |

The data in Table II demonstrates that films of the invention have excellent porosity, pore diameter, Gurley values and mechanical properties, with orientation providing improved Gurley value and tensile properties.

COMPARATIVE EXAMPLE 2

A molten blend of polypropylene (Profax ™ 6273) and tallow amine (Armostat ™ 310) at a weight ratio of polypropylene:tallow amine of 44:56 was cast from a 20.3 cm ×0.5 mm slit gap sheeting die. The die was positioned 1.3 cm above a bath of tallow amine maintained at 54° C. as described in U.S. Pat. No. 4,564,488 (Gerlach et al.). The loss of extruded width of material during film formation was about 56%, the final film being 8.9 cm wide. Film properties are set forth in Table III.

TABLE III

|  | Comparative Example 2 |
| --- | --- |
| Thickness (microns) | 190 |
| Bulk density (g/cc) | 0.436 |
| Porosity (%) | 51.8 |
| Pore diameter (μm) | 0.178 |
| Gurley value (sec/50 cc) | 685 |
| Break elongation (%) |  |
| MD | 272 |
| TD | 110 |
| Bulk tensile at break |  |
| (kPa) MD | 10,949 |
| TD | 5357 |
| Matrix tensile at break |  |
| (kPa) MD | 22,718 |
| TD | 11,115 |

As can be seen from comparing the data regarding Example 2 and Comparative Example 2, the film of Comparative Example 2 exhibits lower bulk and matrix tensile strengths in the transverse direction, lower elongation at break in both the machine and transverse directions and greater loss in extrusion width on cooling.

EXAMPLE 4

High density polyethylene (GM9255 F2, available from American Hoechst Company) and mineral oil (Amoco ™ white Mineral Oil #30 USP Grade) at a polyethylene:mineral oil weight ratio of 20:80 was melt blended in a 40 mm twin screw extruder operated at a decreasing temperature profile of 272° C. to 193° C. the blend was extruded through a 30.5 cm ×0.4 mm slit gap sheeting die at a total throughput rate of 13.6 kg/hr onto a patterned chill roll casting wheel having parallel grooves as was used in Example 1 which was maintained at 32° C. to achieve solid-liquid phase separation. The thus-produced film was then solvent washed in 1,1,1-trichloroethane to remove the mineral oil. The film was biaxially stretched 2×2. The resultant film was a porous material having areas of more open microporosity corresponding to the groove portion of the casting wheel and less open areas of microporosity corresponding to the land portion of the casting wheel. Film properties are set forth in Table IV.

TABLE IV

|  | Example 4 |
| --- | --- |
| Thickness (microns) | 102 |
| Bulk density (g/cc) | 0.098 |
| Porosity (%) | 90 |
| Pore diameter (μm) | 0.77 |
| Gurley value (sec/50 cc) | 6.0 |

As can be seen from the data in Table IV, the film of Example 4 possesses good porosity and pore diameter and excellent Gurley value.

COMPARATIVE EXAMPLE 3

Polypropylene copolymer (Profax ™ 7823, available from Himont, Inc.), 0.3 weight percent nucleating agent (Millad ™ 3905) based on the weight of the polypropylene and mineral oil at a weight ratio of polypropylene:mineral oil of 50:50 were melt blended and extruded as in Example 1. The material was extruded into a water bath maintained at 49° C. to effect solid-liquid phase separation. The thus-produced film was washed in 1,1,1-trichloroethane to remove the mineral oil and then was biaxially stretched 1.5 ×1.5 at 100° C. This microporous film was then embossed on a pyramid patterned roll (30% area embossing) maintained at 110° C. and 103 kPa. The Gurley value, bulk density and porosity were measured before and after embossing. The results are set forth in Table V.

TABLE V

|  | Comparative Example 3 | |
| --- | --- | --- |
|  | Before embossing | After embossing |
| Gurley value | 64.5 | 180 |
| Bulk density | 0.486 | 0.62 |
| Porosity (%) | 45.8 | 30.9 |

The data in Table V demonstrates that embossing a solid-liquid phase separated film reduces the porosity of the film while increasing the bulk density. The Gurley value also increases with embossing indicating a reduction in air flow.

Various modifications and alterations of this invention will be apparent to those skilled in the art without departing from the scope an spirit of this invention and this invention should not be restricted to that set forth herein for illustrative purposes.

What is claimed is:

1. A method for preparing a microporous polyolefin shaped article which comprises the steps of:
   (1) melt blending a polyolefin with an additive which is miscible with the polymer at the melt temperature of the blend but which phase separates on cooling to form a solution;
   (2) forming a shaped article form the solution;
   (3) cooling the shaped article by use of a patterned chill roll to provide areas on the surface of the article where the polymer mixture does not contact the chill roll; and
   (4)
   (a) removing at least a substantial portion of the compatible liquid; or
   (b) stretching the article in at least one direction sufficient to permanently attenuate the article and effect orientation of the polymer; or
   (c) a combination of (a) and (b) to form a microporous polyolefin shaped article having substantially uniform thickness.

2. The method of claim 1 wherein said polyolefin substrate is high density polyethylene, low density polyethylene, polypropylene, copolymers or blends thereof.

3. The method of claim 1 wherein said additive is a non-polar or partially polar liquid or blend thereof.

4. The method of claim 1 wherein said forming step comprises liquid-solid phase separation.

5. The method of claim 1 wherein said forming step comprises liquid-liquid phase separation.

6. The method of claim 1 wherein during said cooling step at least 10% of the surface of the shaped article contacts the patterned chill roll.

7. The method of claim 1 wherein during said cooling step less than about 90% of the surface of the shaped article contacts the patterned chill roll.

* * * * *

UNITED STATES PATENT AND TRADEMARK OFFICE
CERTIFICATE OF CORRECTION

PATENT NO. : 5,238,623
DATED : August 24, 1993
INVENTOR(S) : James S. Mrozinski

It is certified that error appears in the above-indentified patent and that said Letters Patent is hereby corrected as shown below:

| | |
|---|---|
| Col. 1, line 20 | "form" should read -- from -- |
| Col. 1, line 27 | "form" should read -- from -- |
| Col. 2, line 12 | "tot he" should read -- to the -- |
| Col. 3, line 18 | "int he" should read -- in the -- |
| Col. 4, line 36 | after "strength" insert -- of the films which is beneficial in virtually all -- |
| Col. 5, line 32 | "Furley" should read -- Gurley -- |
| Col. 6, line 9 | "38.62," should read -- 38:62, -- |
| Col. 8, line 31 | "the" should read -- The -- |

Signed and Sealed this

Thirty-first Day of May, 1994

Attest:

BRUCE LEHMAN

Attesting Officer     Commissioner of Patents and Trademarks